(12) United States Patent
Cousineau

(10) Patent No.: US 6,978,670 B2
(45) Date of Patent: Dec. 27, 2005

(54) TIRE VALVE-GAUGE COMBINATION

(76) Inventor: William Cousineau, 22 Indian Road, Apt. 111, Sudbury, Ontario (CA) P3E 2M7

( * ) Notice: Subject to any disclaimer, the term of this patent is extended or adjusted under 35 U.S.C. 154(b) by 53 days.

(21) Appl. No.: 10/816,863

(22) Filed: Apr. 5, 2004

(65) Prior Publication Data

US 2005/0217363 A1    Oct. 6, 2005

(51) Int. Cl.$^7$ ............................................. B60C 23/02
(52) U.S. Cl. ..................................... 73/146.8; 137/224
(58) Field of Search ............................ 73/146, 146.2, 73/146.3, 146.4, 146.8, 146.5; 137/224, 227

(56) References Cited

U.S. PATENT DOCUMENTS

| | | | |
|---|---|---|---|
| 1,645,788 A * | 10/1927 | Boies ........................... | 73/714 |
| 1,985,759 A * | 12/1934 | Baumgartner ............... | 137/224 |
| 1,998,420 A * | 4/1935 | Carliss ........................ | 73/709 |
| 2,722,836 A * | 11/1955 | Stec ........................... | 73/146.4 |
| 3,230,968 A * | 1/1966 | Struby ........................ | 137/227 |
| 3,429,332 A * | 2/1969 | Mazeika ..................... | 137/227 |
| 5,569,849 A * | 10/1996 | Cummings ................. | 73/146.8 |
| 5,939,627 A * | 8/1999 | Huang ........................ | 73/146.8 |
| 6,009,749 A * | 1/2000 | Huang ........................ | 73/146.3 |

* cited by examiner

Primary Examiner—Edward Lefkowitz
Assistant Examiner—Andre Allen

(57) ABSTRACT

A tire valve-gauge combination utilized to inflate and deflate conventional tubed or tubeless tires while giving the user an indication of the amount of air pressure within the tire's chamber. The accessory device of the present invention comprises; a flexible rim-attaching base having a larger lower body portion than the rim perforation of a conventional tire and a central neck portion having an outside diameter equal or lesser than said rim perforation, a rigid gauge portion having a transparent molded tube-like form imprinted with markings identifying the location of a moveable luminescent indicator adapted to travel longitudinally within said gauge portion, a cap base portion adapted to securely attach to the upper portion of the gauge portion and slidably communicating with a cap portion. Therefore, when a tire is under pressure, the inner air pressure exerts positive pressure against the under side of the piston, which in turn, displaces the location of said indicator, indicating the tire's air pressure.

12 Claims, 4 Drawing Sheets

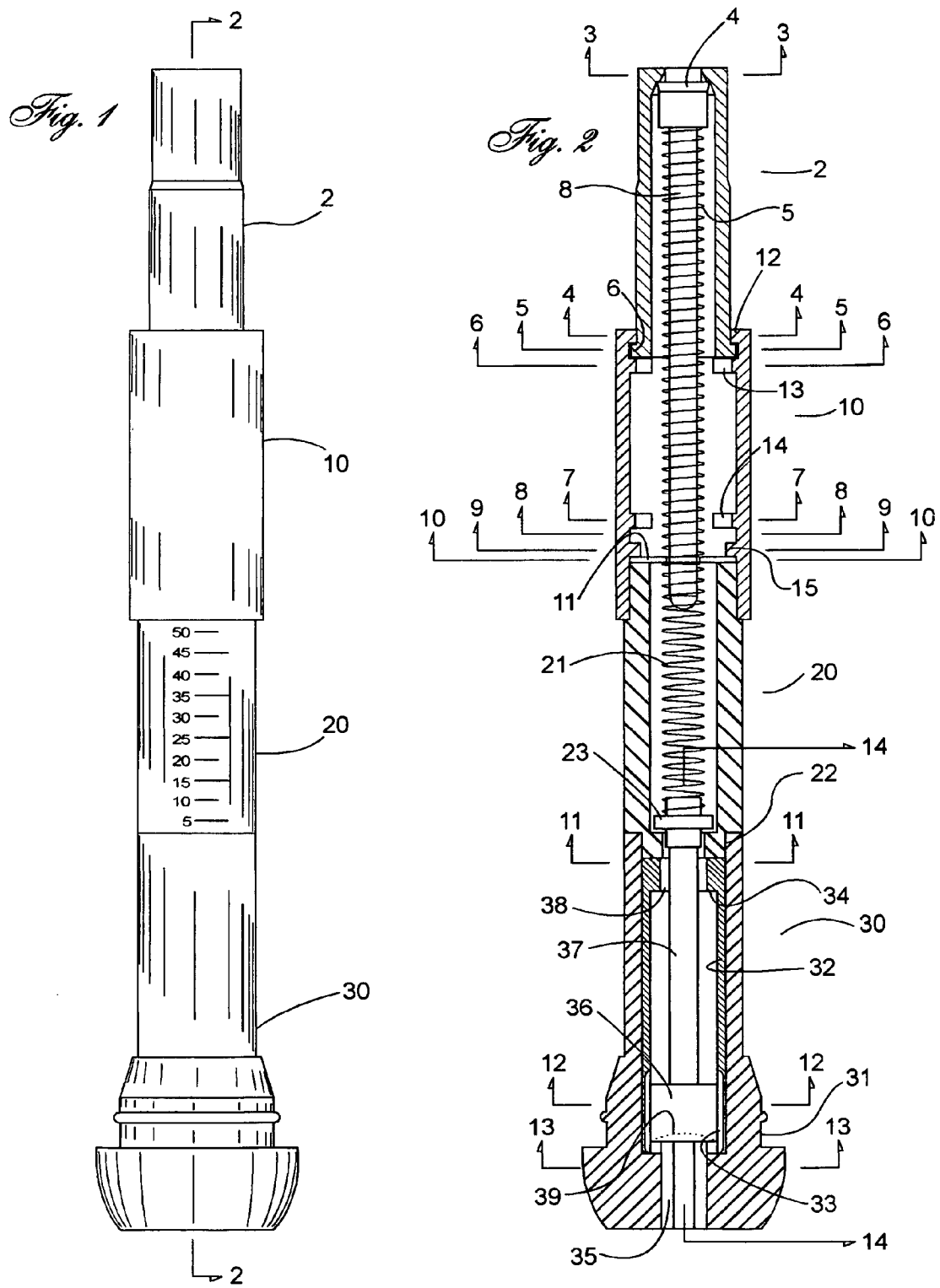

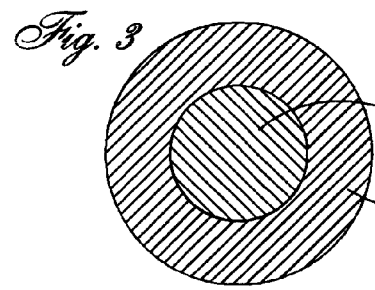
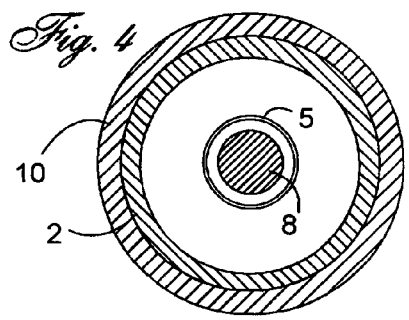
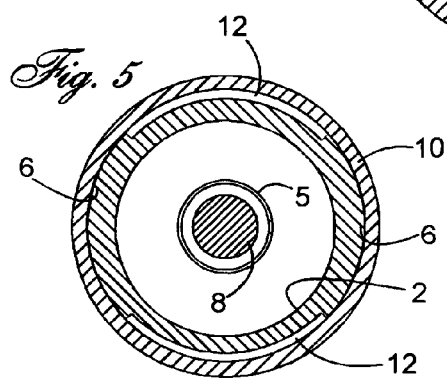
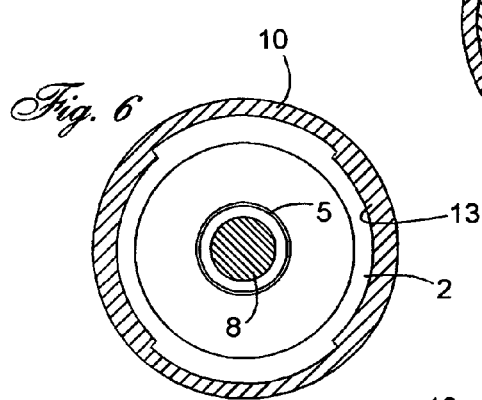
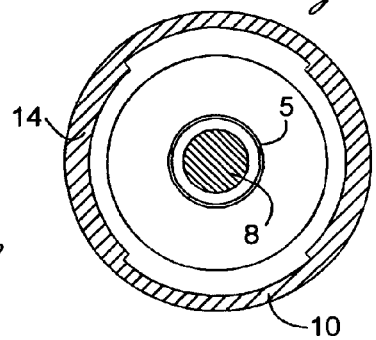
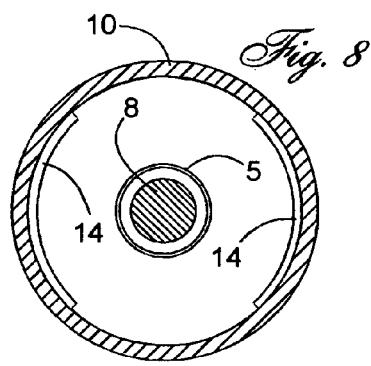
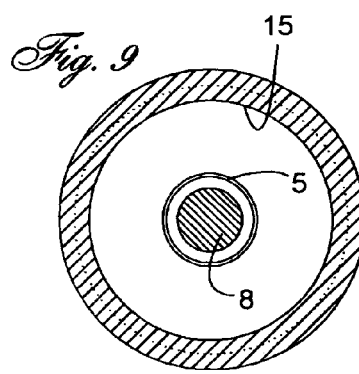
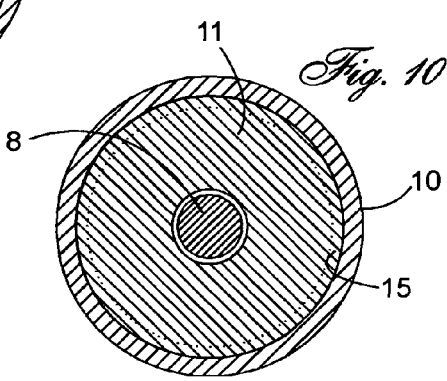

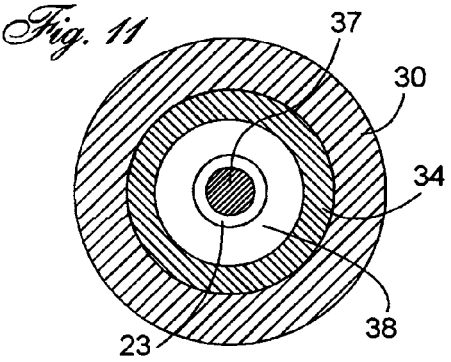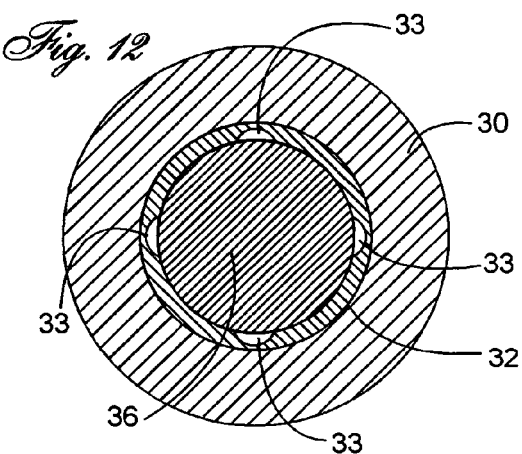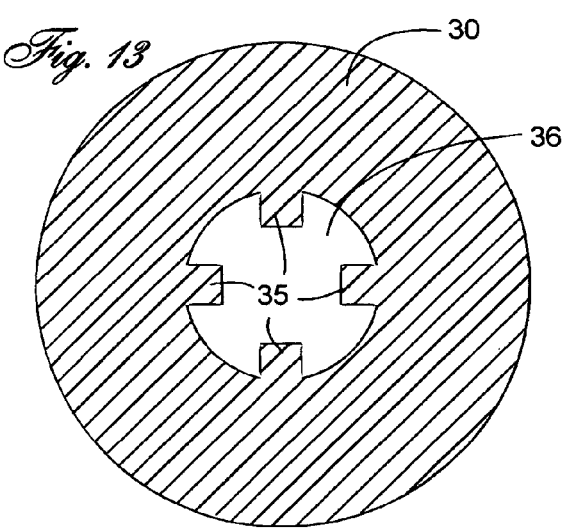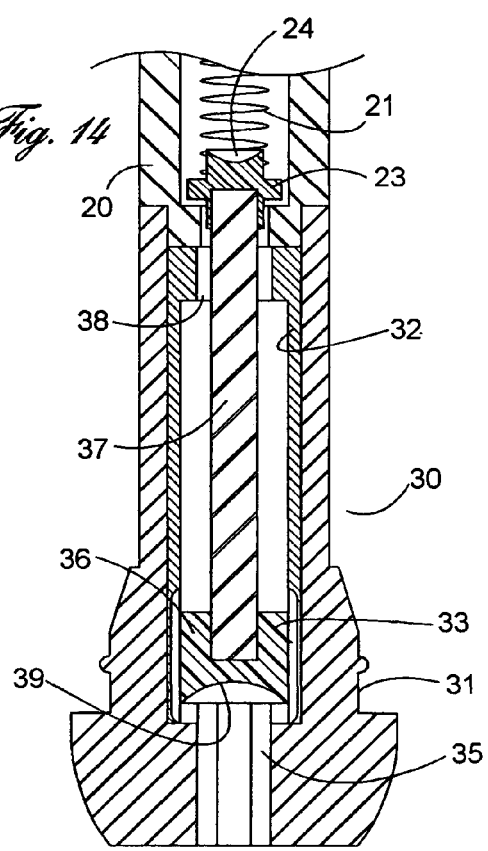

TIRE VALVE-GAUGE COMBINATION

FIELD OF THE INVENTION

The present invention relates to an accessory device utilized to inflate and deflate conventional tubed or tubeless tires while giving the user an indication of the amount of air pressure within the tire's chamber. The accessory device of the present invention comprises; a flexible rim-attaching base having a larger lower body portion than the rim perforation of a conventional tire and a central neck portion having an outside diameter equal or lesser than said rim perforation, a rigid gauge portion having a transparent molded tube-like form imprinted with markings identifying the location of a moveable luminescent indicator adapted to travel longitudinally within said gauge portion, a cap base portion adapted to securedly attach to the upper portion of the gauge portion and slidably communicating with a cap portion. Therefore, when a tire is under pressure, the inner air pressure exerts positive pressure against the under side of the piston, which in turn, displaces the location of said indicator, indicating the tire's air pressure.

BACKGROUND OF THE INVENTION

For many years, inventors have attempted to adapt tire valve stems with an air pressure gauge. However, some of these inventions either did not work or failed to have the flexibility necessary for the abuse taken by valve stems. It is common for drivers to utilize an accessory tire gauge, which requires the removal of the valve stem cover, thereby soiling the driver's fingers in doing so.

Accordingly, it is desirable for drivers to be aware of their vehicle tires' air pressure at a glance, as it is desirable to have this function available in a manner that boasts safety.

Furthermore, owners of these devices desire that the device be permanently installed from within the tire rim to the outside rather than from the outside so as to prevent the theft of these devices. Additionally, in a worst-case event, if a combination valve becomes severely damaged, the combination valve would be required to maintain tire pressure at any cost.

The applicant is aware of several attempts in prior art to provide means of combining a valve stem and a tire gauge. For example, reference may be had to U.S. Pat. No. 1,423,447 of Noe, issued Jul. 18, 1922, which describes a rigid valve stem with a pressure gauge primarily designed to adapt to bicycles. However, this device fails to provide the required flexibility to resist breakage from the day to day abuse imposed onto the device.

Another example of prior art may be had in referring to U.S. Pat. No. 3,230,968 of Struby, issued Jan. 25, 1966, which depicts a permanently installed valve having a color code indicator. However, this valve is very short, making it difficult to view a reading. Additionally, its rigidity may pose a problem in abusive conditions. Furthermore, the telescopic portion is subjected to the elements of dirt and granular material which would therefore render the gauge inaccurate.

Another example of prior art may be had in referring to U.S. Pat. No. 3,906,988 of Mottram, issued Sep. 23, 1975, which illustrates a rigid valve and gauge combination. Again, this valve is rigid and fails to have the ability to flex if stricken.

While many prior art inventions have succeeded in providing vehicle operators with a combination air pressure gauge and valve stem, none have succeeded in offering flexibility with accuracy, safety and durability in such valve stems.

SUMMARY OF THE INVENTION

It is thus the object of the present invention to provide vehicle operators with a combination air pressure gauge and valve stem having flexibility, accuracy and durability all in one affordable unit.

In one aspect of the invention, there is provided a daylight chargeable luminescent gauge indicator, which illuminates in darkness.

In another aspect of the invention, the valve/gauge combination may be calibrated to suit various ranges in pressure by altering the back-load spring and visual markings.

In another aspect of the invention, the valve stem of the present invention may be adapted to form an integral part of a tubed tire by providing a flanged rubber extension to the base so as to allow fixed adhesion to a perforation in a tire tube.

Accordingly, the tire valve-gauge combination of the present invention allows not only the gauging of pneumatic air pressure and safety features, but also provide structural flexibility of the unit while having a luminescent gauge indicator.

The utility of this accessory device includes but is not limited to conventional pneumatic tires.

BRIEF DESCRIPTION OF THE DRAWINGS

These and other advantages of the invention will become apparent upon reading the following detailed description and upon referring to the drawings in which:—

FIG. 1 is a front elevation view of the tire valve-gauge combination of the present invention.

FIG. 2 is a cross-section view taken from FIG. 1 of the tire valve-gauge combination of the present invention.

FIGS. 3 through 13 are cross-section views taken from FIG. 2 of the tire valve-gauge combination of the present invention FIG. 14 is a cross-section view taken from FIG. 2 of the base portion of the tire valve-gauge combination of the present invention

Figures 15, 16, 17, 18:
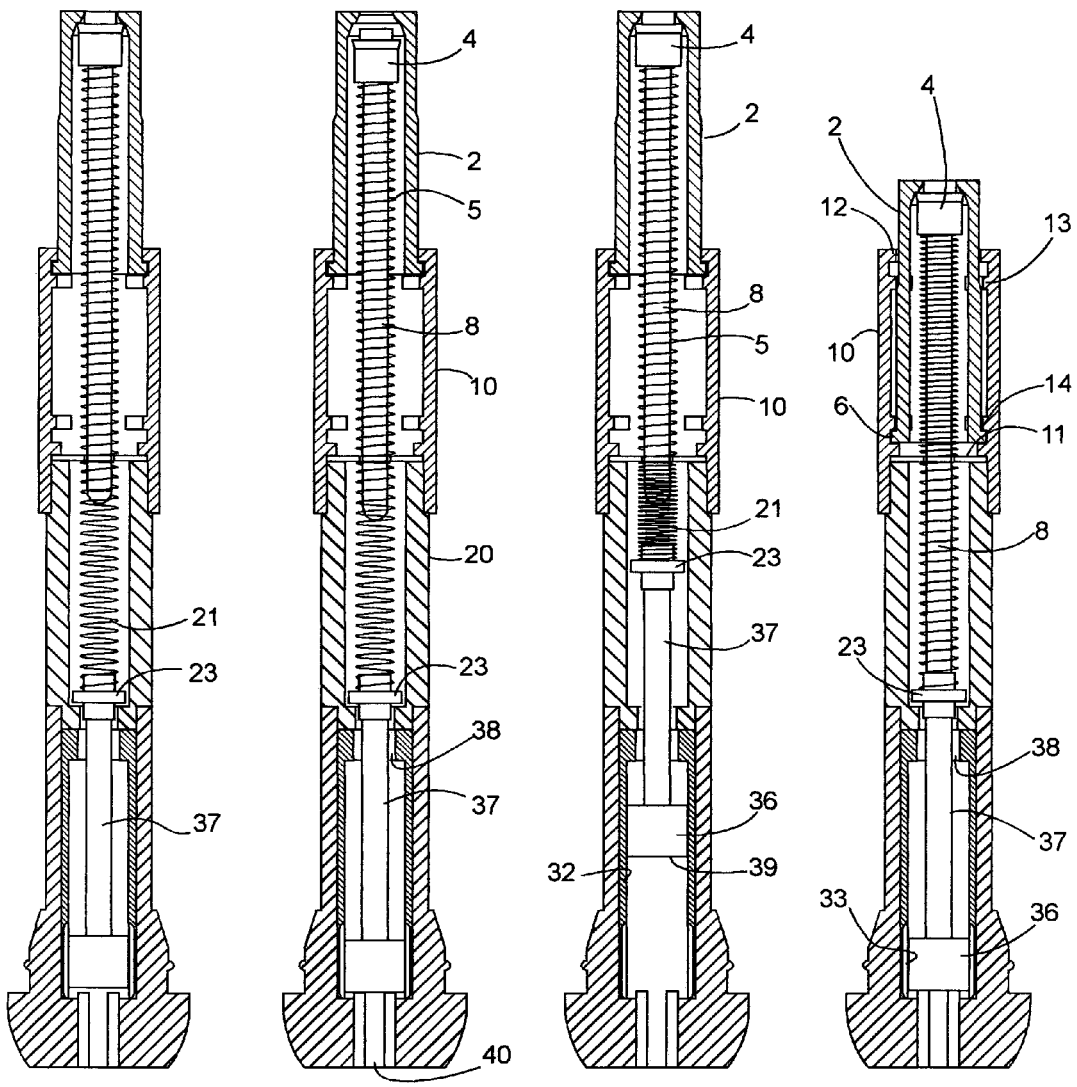
FIG. 15 is a cross-section view of the tire valve-gauge combination of the present invention illustrated in an inert, deflated arrangement.
FIG. 16 is a cross-section view of the tire valve-gauge combination of the present invention illustrated in the inflating arrangement.
FIG. 17 is a cross-section view of the tire valve-gauge combination of the present invention illustrated in a pressurized arrangement.
FIG. 18 is a cross-section view of the tire valve-gauge combination of the present invention illustrating the arrangement while deflating.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENT

In the following description, similar features in the drawings have been given similar reference numerals.

Turning to FIG. 1, which illustrates the arrangement of the various components forming part of the present invention comprising generally: a base portion 30, a gauge portion 20, a cap base portion 10 and a cap 2 wherein the base 30 is fabricated of a resilient rubber-like material having a lower body portion larger than the valve perforation of a conventional tire rim and a central neck portion having an outside diameter equal or lesser than said rim perforation, the gauge portion 20 fabricated of a clear rigid material having imprinted markings identifying the location of a longitudinally moveable indicator adapted to travel within said gauge portion, the cap base portion 10 is adapted to securely attach to the upper portion of the gauge portion 20 and slidably communicating with a cap portion 2.

Turning to FIG. 2, illustrating a cross-section view taken from FIG. 1 of the present invention depicting the arrangement of the various components forming part of the invention wherein, the base portion 30 further comprises: a rim-attaching portion 31 having a lower body portion larger than the valve perforation of a conventional tire rim and a central neck portion having an outside diameter equal or lesser than said rim perforation to form a seal with said tire rim, a rigid tubular inner sleeve 32 moldedly integrated within the mid and upper inner cylindrical portion of the base 30, and a plurality of inwardly and upwardly protruding ridges 35 adapted to prevent full descent of a piton 36. Said inner-sleeve 32 is adapted with flow ridges 33 near the lowermost inner portion of said inner sleeve 32, and a necked portion 34 integral with said inner sleeve 32 preventing the piston 36 from traversing outside the upper portion of said base 30 thereby ensuring that the valve of the present invention is never susceptible to leakage. A piston 36 is fixedly attached to a stem 37 where, said piston is flexibly resilient and is adapted with a concave shape 39 at its very bottom surface thereby promoting a durable continuous seal to the inner wall surface of the inner sleeve 32 unless said piston 36 is placed at or near the bottom area of said inner sleeve 32, which at such a time the flow channels 33 would thereby allow said seal to be broken in order to deflate a tire. The gauge portion 20 further comprises: a tubular transparent rigid material onto which markings are disposed so as to allow user to view the pressure at the valve, a lower base attaching portion 22 fixedly attached to said base 30, an upper cap base attaching portion also fixedly attached to the lower portion of said cap base 10, an indicator 23 frictionally attached to the upper end of the piston stem 37 of the base portion 30, a lower spring 21 frictionally engaged to the upper portion of the indicator 23 and restedly engaged to a divider disk 11 located between the joint where the cap base portion 10 and gauge portion. A cap base 10 made from a rigid material having a generally tubular form and an array of circular and semi-circular inwardly protruding rings integral with the inner surface of said tubular cap base 10 wherein the upper ring 12 is fully circular, the upper stop ring 13 is a pair of quarter rings, the lower stop ring 14 is also a pair of quarter rings, and the lower ring 15 is also fully circular. The cap 2 is a rigid generally tubular form having a lower lip 6 a body portion having a mid to lower portion with an outer diameter generally equal to that of the opening at the top of the cap base and an upper portion having a diameter slightly reduced than that of the cap's mid to lower portion, an opening at the very top of said cap is provided and comprises a narrow top portion extending only slightly then beveled outwardly in two stages. A plunger 8 is provided as an extension to the cap 2 which said plunger extends through the cap base 10 and into the upper portion of the gauge 20. A dust cap 4, frictionally attached to said plunger 8 is adapted to auto center to the opening at the top of the cap 2, where the upper portion of the dust cap 4 has an upper sealing portion of equal or slightly smaller diameter than that of the cap opening with which it mates. An upper spring 5 is slidably engaged around the outside of the plunger 8. Said upper spring 8 is restedly engaged with the under side of the dust cap and also restedly engaged to the divider disk 11 thereby compressing said spring when the cap is depressed downwardly to the end of its travel distance.

Turning now to FIGS. 3 through 13, all cross-sectional views taken from FIG. 2 illustrating the important details of the configuration and arrangement of the various portions of the present invention wherein, FIG. 3 depicts a section of the cap 2 mating with the upper end of the dust cap 4.

FIG. 4 depicts a section of the cap 2 and cap base 10 portions illustrating an equal fit between said cap 2 and cap base 10, and the plunger 8 surrounded by the upper spring 5.

FIG. 5 depicts a section of the cap 2 and cap base 10 portions illustrating in particular, the cap quarter rings 6 seated below the retainer 12 at the uppermost portion of the cap base 10, and again the plunger 8 surrounded by the upper spring 5.

FIG. 6 depicts a section of the cap base 10 illustrating the cap 2 shown behind the upper quarter rings 13 and yet again the plunger 8 surrounded by the upper spring 5.

FIG. 7 depicts a section of the cap base 10 having a pair of lower quarter rings 14 extending inwardly from the inner wall surfaces of said cap base 10, and the plunger still surrounded by the upper spring 5.

FIG. 8 depicts a section of the cap base 10 further illustrating the lower quarter rings 14, and the plunger and upper spring 5.

FIG. 9 depicts a section of the cap base 10 having a full lower ring 15 surrounding the plunger 8 and upper spring 5 assembly.

FIG. 10 depicts a section of the cap base 10 having a divider disk 11 adapted with a perforation having an inner diameter slightly greater than the outer diameter of the plunger 8. Said divider disk is compressedly engaged between the lower full ring 15 and the upper portion of the gauge portion.

FIG. 11 depicts a section of the base portion 30 further illustrating the base 30 upper body integrally attached to the inner sleeve 32, through which the piston stem 37 traverses. Clearance 38 is provided so as to allow airflow between the inner sleeve's 32 necked portion 34 and the piston stem 37. Additionally this figure illustrates the placement of the indicator 23 onto the upper end of said piston stem 37.

FIG. 12 depicts a section of the base portion 30 illustrating the base 30 integrally adapted with an inner sleeve 32, which said inner sleeve 32 is further adapted with a plurality of flow channels 33. The piston 36 is of generally the same outer diameter as the inner diameter of the inner sleeve 32 thus creating a positive seal therebetween unless said piston is displaced at the area in the inner sleeve 32 has flow ridges 33, then the air would be allowed to flow around the piston 36 through said ridges 33.

FIG. 13 depicts a section of the base 30 wherein a plurality of inwardly and upwardly protruding ridges 35 is adapted to prevent full descent of the piton 36 while preventing a seal when said piston 36 is lowered.

Turning now to FIG. 14, depicting a cross-sectional view of the base portion 30 of the tire valve-gauge combination of the present invention further illustrating sections of the piston 36, the piston stem 37 and the indicator 23 wherein, the indicator is frictionally attached to the upper end of the piston stem 37, and said piston stem is fixedly and centeredly attached to the piston 36. Therefore, as pressurized air pushes upward to the underside of the concaved piston 36, the outer peripheral edges of said piston 36 would be forced against the inner sleeve's 32 inner wall surface. A lower spring 21 is provided, which is frictionally engaged to the indicator 23. Said spring 21 is the calibrating factor in that, the stronger the spring, the more pressure the valve-gauge can measure. The piston 36, now shown in a deflate or unpressurized mode, frictionally and longitudinally engages within the smoothed inner wall surface of the inner sleeve 32 and maintains a seal when traveling the mid to upper portion of said sleeve unless the piston is displaced to the lower portion of the inner sleeve 32 where at such time airflow would be allowed through the plurality of flow channels 33 thereby depressurizing the vessel on which the valve is installed. The valve installs exactly as a conventional valve stem wherein the valve is put in place from the inside of the tire rim, then the tire is applied to said rim. This prevents the valve from accidentally coming out thus fully irreparably depressurizing the tire. Furthermore, like conventional tire valve stems, this valve would be subjected to obstacle, which could damage the valve if the valve were installed rigidly, and for this, the inner rigid sleeve 32 of the present invention terminated only near the area 31 where the valve protrudes from the tire rim. Additionally, the piston 36 is adapted with a concaved lower surface 39 whereby air pressure from the vessel or tire would place additional outward force to the piston's 36 lower periphery therefore guaranteeing a positive seal.

Now let's turn to FIGS. 15 through 18, all cross-sections of the tire valve-gauge of the present invention wherein FIG. 15 illustrates the valve in a fully deflated state, FIG. 16 illustrates said valve in an inflating state, FIG. 17 illustrates the valve in a pressurized state, and FIG. 18 illustrating said valve in a deflating state.

In FIG. 15, the lower spring 21 applies a slight downward force on the indicator 23, which is frictionally engaged to the upper end of the piston stem 37, which is in turn fixedly attached to the piston 36. Airflow is thereby allowed from the vessel or tire to the upper portion of the valve.

In FIG. 16, while inflating the vessel or tire, the dust cap, frictionally attached to the plunger 8 is lowered, allowing airflow around said dust cap 4, down through the cap 2, the cap base 10, the gauge 20, around the indicator 23, through the opening 38 around the piston stem 37, around the piston 36, through the flow channels 33, then through the valve lower opening 40 and into the vessel or tire. When the fill valve is remove from the cap 2, the upper spring 5 pushes the dust cap 4 back to its sealed position FIG. 17 now illustrates the arrangement of the components of the present valve while under pressure. Note that the air pressure within the vessel places an upward force below the piston 36 concaved bottom surface thereby displacing the piston 36, piston stem 37 and indicator 23 upwardly, making a positive seal between the inner wall surface of the inner sleeve 32 and the outer periphery of the piston 36. The lower spring 21 counteracts this force downwardly to a point of equilibrium where the spring 21 force and the air pressure are equal, thus stabilizing the piston 36 and indicator 23. The higher the air pressure, the higher the piston 36 and indicator 23 would travel, thus giving a user a good indication, at a glance, of the vessel or tire's air pressure.

FIG. 18 illustrates the arrangement of the valve components in a deflating state wherein; reference should be made once again to FIGS. 3 through 14 for clarity. The cap 2 is rotationally and longitudinally engaged within the cap base 10, and is adapted with two quarter rings 6 better seen in FIG. 5, and the cap base 10 is adapted with inwardly protruding upper 13 and lower 14 quarter rings, where in order to move the cap 2 downwardly into the cap base 10, the cap 2 must be rotated to match the quarter rings 6 and 13 as like a pair of puzzle pieces so as to allow the cap 2 to get past the cap base's 10 inner quarter rings 13 and 14. The upper inner quarter rings 13 serve to lock the cap 2 in an extended position, and the lower inner quarter rings 14 serve to lock the cap 2 in a deflate position if desired. Therefore, to deflate the vessel, user simply rotates cap 2 until it matches the upper inner quarter ring 13 profile and presses downwardly past the upper and lower inner quarter rings 13 and 14. The cap 2 would bring with it the dust cap 4 attached to the plunger 8 through the divider disk 11, and compress an upper spring 5 thereby returning cap 2 to its erect position when released, unless user rotates cap 2 past the lower inner quarter rings 14 thereby locking said cap 2 in a deflating mode. When the plunger 8 is lowered as described above, said plunger 8, having a rounded hemispherically convexed lower end, pushed down on the upper end of the indicator 23, where said indicator has a similar hemispherically but concaved upper end as seen in FIG. 14. Thus the descent of the plunger 8 would also lower the indicator 23, the piston stem 37 and the piston 36 to a point where airflow would be possible through the flow channels 33. Air from the vessel would therefore travel upwardly through the flow channels 33, over the piston 36, along the piston stem 37, through the stem opening 38, around the indicator 23, along the plunger 8, through the dividing disk 11 opening, into the cap base 10, around the cap 2, and through a now created ringed space between the upper opening of the cap base 10 and the upper narrowed portion of the cap 2.

Therefore, it is now possible, through the use of the valve-gauge combination of the present invention, to securely install a tire valve-gauge combination where a user simply glances down at said valve to get an indication of tire pressure without the messy hassle common to this task. Furthermore the valve of the present invention cannot be removed or stolen from the tire when installed, and will not accidentally deflate said tire even if the upper portions of the valve are damaged or destroyed.

What I claim as my invention:
1. A tire valve-gauge combination comprising:
  i. a rim-attaching base portion having:
    a. a tire rim sealing portion having a lower body portion larger than the valve perforation of a conventional tire rim and a central neck portion having an outside diameter equal or lesser than said rim perforation to form a seal with said tire rim,
    b. a rigid tubular inner sleeve moldedly integrated within the mid and upper inner cylindrical portion of the base,
    c. a plurality of inwardly and upwardly protruding ridges adapted to prevent full descent of a piton, and
    d. a piston is fixedly attached to a stem where, said piston is flexibly resilient and is adapted with a concave shape at its very bottom surface thereby promoting a durable continuous seal to the inner wall surface of the inner sleeve unless said piston is placed at or near the bottom area of said inner sleeve, ii. a gauge portion having:
   a. a tubular transparent rigid material onto which markings are disposed so as to allow user to view the pressure at the valve,
   b. a lower base attaching portion fixedly attached to said base,
   c. an upper cap base attaching portion also fixedly attached to the lower portion of said cap base,
   d. an indicator frictionally attached to the upper end of the piston stem of the base portion,
   e. a lower spring frictionally engaged to the upper portion of the indicator, and
   f. a divider disk located between the joint where the cap base portion and gauge portion meet, iii. A cap base made from a rigid material having:
   a. a generally tubular form and an array of circular and semi-circular inwardly protruding rings integral with the inner surface of said tubular cap base wherein;
      i. the upper ring is fully circular,
      ii. the upper stop ring is a pair of quarter rings,
      iii. the lower stop ring is also a pair of quarter rings, and
      iv. the lower ring is also fully circular, iv. A cap portion having:
   a. a generally tubular form,
   b. a lower lip extending slightly outwardly from the bottom periphery thereof,
   c. a body portion having a mid to lower portion with an outer diameter generally equal to that of the opening at the top of the cap base,
   d. an upper portion having a diameter slightly reduced than that of the cap's mid to lower portion,
   e. an opening at the very top of said cap is provided and comprises a narrow top portion extending only slightly then beveled outwardly in two stages,
   f. a plunger extends through the cap base and into the upper portion of the gauge,
   g. a dust cap, frictionally attached to said plunger is adapted to auto center to the opening at the top of the cap, where the upper portion of the dust cap has an upper sealing portion of equal or slightly smaller diameter than that of the cap opening with which it mates, and
   h. an upper spring slidably engaged around the outside of the plunger wherein said upper spring is restedly engaged with the under side of the dust cap and also restedly engaged to the divider disk thereby compressing said spring when the cap is depressed downwardly to the end of its travel distance.

2. The inner sleeve of the tire valve-gauge combination of claim 1 wherein said inner sleeve is adapted with flow ridges near the lowermost inner portion of said inner sleeve, and a necked portion integral with said inner sleeve preventing the piston from traversing outside the upper portion of said base thereby ensuring that the valve of the present invention is never susceptible to leakage.

3. The tire valve-gauge combination of claim 1 wherein the piston has an outside diameter generally equal to the inner diameter of the inner sleeve in which it travels longitudinally.

4. The tire valve-gauge combination of claim 1 or 3 wherein, the piston is adapted with a concaved bottom surface so as to promote a positive seal when valve is under pressure.

5. The tire valve-gauge combination of claim 1 or 3 wherein, the piston is fabricated of a rubber-like flexible, semi-resilient material.

6. The inner sleeve of the tire valve-gauge combination of claim 1 or 2 wherein, the mid to upper inner surface of the sleeve conforms to the outer profile of the piston and the lower portion of said sleeve does not, in order to break the seal to allow airflow around the piston.

7. The tire valve-gauge combination of claim 1 wherein the lower spring's strength can be altered to calibrate the valve for various pressure ranges.

8. The lower spring of the tire valve-gauge combination of claim 1 or 7 wherein said spring is retained by a divider disk between the lower portion of the cap base and the upper portion of the gauge portion.

9. The tire valve-gauge combination of claim 1 wherein the indicator further comprises a luminous material, chargeable by daylight.

10. The cap of the tire valve-gauge combination of claim 1 further comprising an outwardly protruding rim at its lower outer edge to prevent extraction of said cap from the cap base.

11. The cap base of the tire valve-gauge combination of claim 1 or 10 further comprising a fully circular upper ring to prevent extraction of cap, a pair of upper quarter rings to prevent undesired descent of the cap, a pair of lower quarter rings to lock the cap in deflate mode without having to hold said cap down.

12. The tire valve-gauge combination of claim 1 or 3 wherein the use thereof is to allow users to easily determine tire pressure within individual tires or vessels and the like without getting soiled or the need of separate gauges and tools.

* * * * *